E. W. DUNN.
HEATER.
APPLICATION FILED JUNE 29, 1912.
1,067,009.
Patented July 8, 1913.
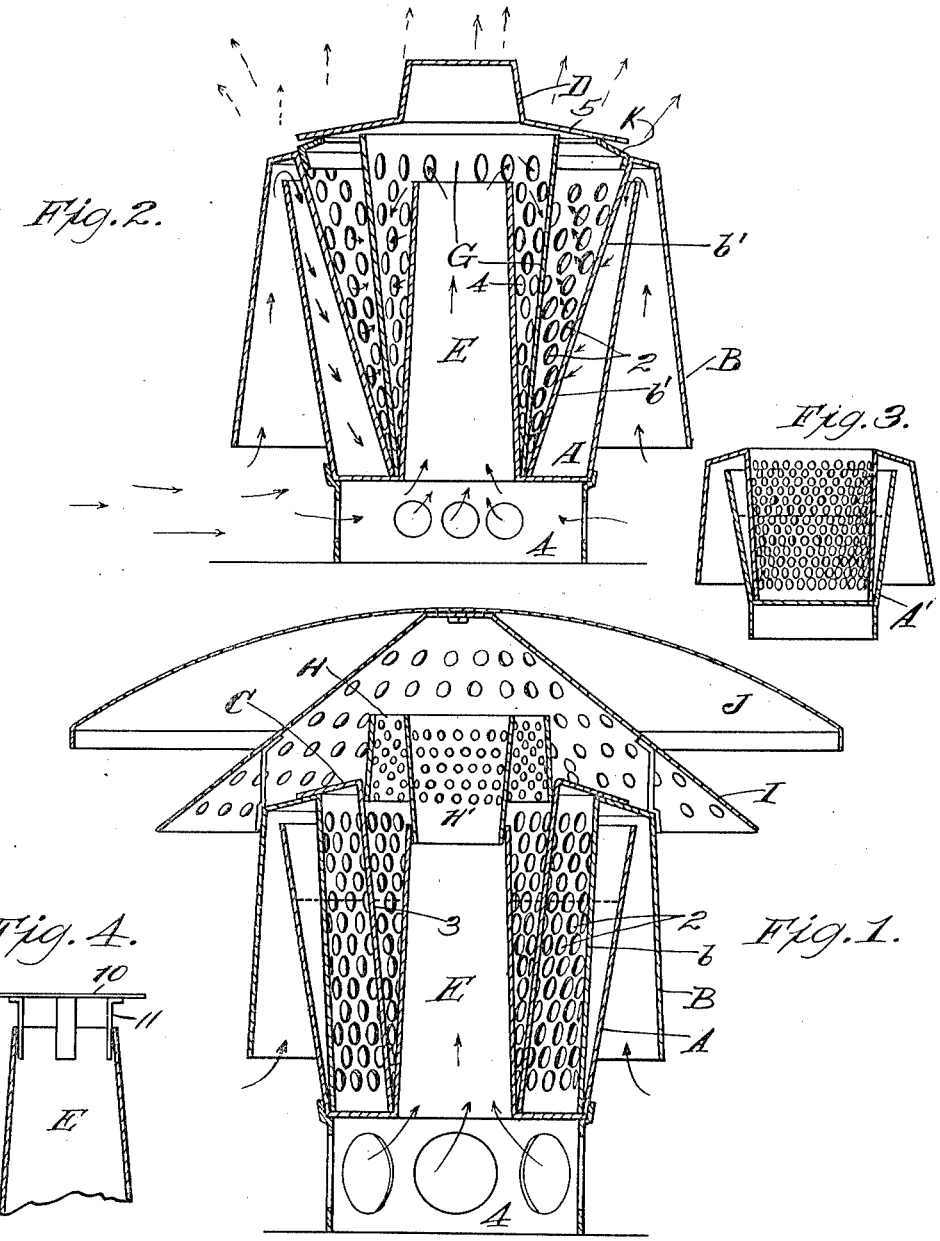

UNITED STATES PATENT OFFICE.

EMANUEL W. DUNN, OF SAN FRANCISCO, CALIFORNIA.

HEATER.

1,067,009.   Specification of Letters Patent.   Patented July 8, 1913.

Application filed June 29, 1912. Serial No. 706,614.

*To all whom it may concern:*

Be it known that I, EMANUEL W. DUNN, a citizen of the United States, residing in the city and county of San Francisco and State of California, have invented new and useful Improvements in Heaters, of which the following is a specification.

My invention relates to an apparatus which is especially designed for the burning of petroleum or any of its products in the open air.

It consists in a combination of parts of construction which will be more fully explained by reference to the accompanying drawings, in which—

Figure 1 is a vertical sectional view of my heater in one arrangement. Fig. 2 is a vertical sectional view of another arrangement of the heater. Fig. 3 is a vertical sectional view of the burner pot without the central air flue. Fig. 4 shows an attachable elevated deflector.

It is the object of my invention to provide means for burning petroleum in the open air for the purpose of generating heat. The apparatus is so constructed as to produce the proper combustion of the fuel, making it practical to operate in a citrus grove without damaging the fruit with smoke or soot.

As shown in the drawings, A is a pot, or receptacle for holding the oil, and is tapered so that when made from sheet metal or made from heavier material, it can be nested.

B is the annular, inverted telescopic flue for vessel A and is constructed in such a manner as to fit over the rim of the vessel A, allowing a space sufficiently large for admitting air between the pot and the outside wall of the covering; this telescopic flue when placed over the pot, is held high enough above the top of the rim of the pot to allow the air that comes in at the outside passing up along the wall of the telescope and the surface of the pot and discharge over the top of the pot, and downwardly between the tapering wall of the pot. The inside tapering wall $b$ of the telescopic flue is perforated with openings 2, allowing air admitted from the outside on its passage around the outside of the shell of the pot to flow over the rim of said pot and discharge through the openings on the inside of said telescope to mingle with the carbon gas formed from the oil burning in said pot. The suction caused by the heat from the fire pulls the air from the outside in through these perforations which follows down along the top or the surface of the oil as it is consumed, bringing the air constantly in contact with the surface of the burning oil, thus producing a mixture of carbon and oxygen for the purpose of combustion.

C is a collar or flange made to set over the mouth of the pot A, resting on the rim of telescope B. Attached to this collar is a perforated tapering sleeve 3 which fits the collar in such a manner as to carry the burning gases along the said perforations which admit oxygen to create more perfect combustion. These collars are also used for the purpose of increasing or decreasing the volume of fire or heat desired and are made in sizes interchangeable for said purpose.

D is a cap or lid with flange adapted to rest on upper part of heater to hold combustion inside of burner, and when inverted may be used for extinguishing the fire and preventing water or dirt getting into vessel A.

E is a center tapering air tube extending with its opening in line with the top of walls of pot A. Through this tube air is taken under the pot, the pot resting on legs or an extension 4, suitably high for admitting a sufficient volume of air to fill this inner tube E, which may be omitted if desired, as in Fig. 3.

In Fig. 4 is shown a plate, damper or deflector 10, having downwardly projecting spring prongs 11, which may be inserted in the upper end of the central air flue E, so that the upwardly ascending current of air in the flue E will be deflected by the device 10, so as to thoroughly mix with the gases generated by the heat of combustion in the heater. The plate like deflector 10 may be elevated or lowered as desired, relative to the upper end of the tube E.

G is a perforated tapering cup telescoping tube E; having perforations 4, in the walls so proportioned that the air admitted through the tube E and carried up under cup G, is distributed through the graduated perforations in line with the oil, following the oil surface down to the bottom of pot A.

H shows perforated rim which may be set on top of sleeve 3. This perforated rim or band H corresponds to the perforated sleeve, and is for the purpose of developing more perfect combustion in the gases as they are discharged from the heater into the open air as heat units.

I shows a perforated conically shaped dome which may be adjusted over the top of fire vessel A.

J shows a cover attached to the dome I, in such a manner as to form a perfect umbrella or hood for spreading the heat generated from the oil in vessel A and distributed through the perforations in I, thus preventing the heat units under the cap or covering J, from ascending, but deflecting same near surface of ground. Both I and J are extra attachments and can be placed on vessel A or taken off at will, as also are parts H—H' and C.

In some conditions it may be only necessary to use the heater in its simplest form, as illustrated in Fig. 3, in which the oil vessel A' has a solid bottom without the central air flue, and over the rim of the pot is adjusted the annular, inverted air flue B with its skirt b, centered by bearing against the bottom of the wall of vessel A', as also shown in Fig. 1.

In some instances that arrangement of my heater which is illustrated in Fig. 2 is adaptable, and this arrangement comprises the oil pot A with the central air flue or tube E, and also involves the use of the inverted annular flue B, the inner tapering wall b' of which is shown as encompassing approximately the base of the flue E.

For the purpose of nicely controlling the volume of heat generated, I have shown in Fig. 2 an annular flange or reducer K, of which different sizes may be provided, one of which may rest, as shown, on the upper rim of the inverted flue B. And in the arrangement at Fig. 2, I have shown the heater as including the central annular tapering distributer G; the lower end of which approaches the base of the central air flue B, and as air rises in the central flue, the cap D will cause the deflection of the incoming air through the perforations 4 of the deflector, so that the zone of combustion in this arrangement is between the exterior of the distributer G and the interior wall of the inverted flue B. Sufficient air for combustion in this zone is provided by the space between the walls of the flue B, and also provided by the device G through the perforations 4 of which the air will draw from the central flue E.

In addition to the means K being provided for reducing the area of the heater, the cap D may also have an annular flange 5, so that when caps of different size are employed the central area of the heater is varied without varying the circumference as determined by the reducer K when this is used, or without varying the circumference of the plain open arrangement of the heater as indicated in Fig. 3.

In that arrangement of my heater shown in Fig. 1, I employ the oil vessel A with the central air flue E and the inverted flue B, and for the purpose of obtaining a perfect control of combustion and mixture of the fumes, I may use the perforated sleeve 3 with its flange C; the latter resting on the upper rim of the flue B. In this arrangement air is drawn through the central air flue E and the inverted annular flue B, passing through the perforated wall of the latter into the chamber formed outside of the sleeve or mixer 3, where the mixed air and fumes pass into the combustion zone between the inner surface of the mixer 3 and the exterior of the flue E, the heat of combustion rising freely therebetween. I have also shown in Fig. 1 the arrangement as including the annular ring-like extensions H—H', which fit respectively, the upper portions of the mixer sleeve 3 and the central air flue E. By using the extensions H—H', the height of the combustion zone or chamber outside of the flue E is increased so that a free discharge of the burning fuel occurs at a location somewhat higher than when these are not used.

Having thus described my invention, what I claim and desire to secure by Letters Patent, is—

1. An orchard heater comprising an oil vessel and an annular flue having inner and outer skirt-walls telescoping the wall of the oil vessel and leaving an annular passageway for the upward flow of air outside of the oil vessel, and downwardly inside of the same, the inner wall of the flue being perforated, and a perforated tubular flue forming a fire-chamber into which air is fed from the inner air feeder.

2. A heater comprising an oil vessel, an annular flue having inner and outer skirt walls telescoping the wall of the oil vessel and leaving an annular passageway for the upward flow of air outside of the oil vessel, and downwardly inside of the same, the inner wall of the flue being perforated, a combustion chamber within the inner wall and having a perforated wall, and a central air flue connected to the bottom of the vessel for conveying air upwardly therethrough.

3. A heater comprising an oil vessel having an open top, an annular flue having inner and outer skirt walls telescoping the wall of the oil vessel and leaving an annular passageway for the upward flow of air outside of the oil vessel, and downwardly inside of the same, the inner wall of the flue being perforated, a perforated wall forming a combustion zone within the inner wall, a central air flue connected to the bottom of the vessel for conveying air upwardly therethrough, and a cap for the heater to inclose the combustion zone.

4. A heater comprising an oil vessel having an open top, an annular flue having inner and outer walls telescoping the wall of the oil vessel and leaving an annular passageway for the upward flow of air outside of the oil vessel, and downwardly inside of the same, the inner wall of the flue being perforated, a central air flue connected to the bottom of the vessel for conveying air upwardly therethrough, and a cap for the heater to inclose the combustion zone, said cap being reversible to close the central air flue and put out fire.

5. A heater comprising an oil vessel having an open top, an annular flue having inner and outer skirt-walls telescoping the wall of the oil vessel and leaving an annular passageway for the upward flow of air outside of the oil vessel, and downwardly inside of the same, the inner wall of the flue being perforated, a heat flue surrounded by the inner skirt, a central air flue connected to the bottom of the vessel for conveying air upwardly therethrough, and a cap for the heater.

6. A heater comprising an oil vessel, an annular flue within the vessel leaving an annular passageway downwardly inside of the same, the wall of the flue being perforated from top to bottom, a central air flue connected to the bottom of the vessel for conveying air upwardly therethrough, said oil vessel being elevated for the admission of air to the bottom of the central flue, and a perforated flue forming a fire zone within and fed with air from the annular flue.

7. An orchard heater comprising an oil container or vessel, and a tubular member of less diameter than, and supported upon the vessel and projecting upwardly therein and close to the wall thereof to form an annular flue space at the inner surface of the vessel through which air may circulate and follow down the exterior of the member as the oil is consumed, the member having apertures for admitting the air over the surface of the oil in its interior.

8. An open air heater comprising an oil container or vessel, a vertical, perforated tube or combustion chamber, a removable interchangeable cover part at the upper part of the heater and adjacent to the tube, and means for admitting air into the container and conveying the air downwardly onto the surface of the oil within the container to support combustion within the lower portion of the heater as the level of the oil lowers.

9. A heater comprising an oil containing vessel, means for admitting air into the container and conveying the same downwardly upon the surface of the oil, and a perforated combustion flue extending upwardly through said vessel and into which flue air is drawn from the supply means across the oil surface, said means consisting of an annular, perforated sleeve extending into the vessel and forming a flue between its outer surface and the adjacent surface of the vessel wall.

10. An orchard heater comprising an oil containing vessel, means for admitting air into the vessel and conveying the same downwardly upon the surface of the oil, a central air flue extending upwardly through said container, and a deflector at the upper portion of the heater against which the rising air and vapors impinge and are deflected and intermingled.

In testimony whereof I have hereunto set my hand in the presence of two subscribing witnesses.

EMANUEL W. DUNN.

Witnesses:
 WALTER REIMERS,
 GENEVIEVE S. DONELIN.